United States Patent

[11] 3,604,252

[72] Inventor Basil B. Beeken
  New Haven, Conn.
[21] Appl. No. 11,734
[22] Filed Feb. 16, 1970
[45] Patented Sept. 14, 1971
[73] Assignee Pitney-Bowes, Inc.
  Stamford, Conn.

[54] INTERFEROMETRIC SYSTEM FOR MEASURING PHYSICAL CONDITION OF A MEDIUM
4 Claims, 2 Drawing Figs.

[52] U.S. Cl. .................................................. 73/69,
  73/24, 73/30, 73/53, 73/339
[51] Int. Cl. .................................................. G01n 9/24
[50] Field of Search ........................................... 73/24, 32,
  53, 69, 339, 432 L, 67.5 H, 388, 30; 181/0.5 NP;
  356/107

[56] References Cited
UNITED STATES PATENTS
1,528,586  3/1925  Tate ........................... 73/24
2,795,991  6/1957  Tuzi ........................... 356/107
3,354,311  11/1967  Vali et al. ..................... 73/71.3 UX
3,381,134  4/1968  Wolf ........................... 356/107

OTHER REFERENCES
Techniques and Information content of Sonoholograms P. Greguss, the Journal of Photographic Science Vol. 14, Nov/Dec. 1966, p. 329–332.

Primary Examiner—Richard C. Queisser
Assistant Examiner—John P. Beauchamp
Attorneys—William D. Soltow, Jr., Albert W. Scribner and Martin D. Wittstein ABSTRACT: An acoustical interferometric system that includes two effective sources of ultrasonic radiation for establishing a normal pattern of interference fringes, the radiation from one of said sources passing through a fluid medium that is subject to physical changes, such as temperature and/or density changes, whereby such changes can be effectively sensed by detecting means that are sensitive to shifts in the pattern of interference fringes; such shift being caused by variations in the speed at which the acoustical radiation is conducted through said medium, the speed variations resulting from the said physical changes.

PATENTED SEP 14 1971

3,604,252

INVENTOR
BASIL B. BEEKEN

BY
Albert W. Scribner
ATTORNEY

INTERFEROMETRIC SYSTEM FOR MEASURING PHYSICAL CONDITION OF A MEDIUM

This invention relates to a novel acoustical interferometric system. More particularly the invention relates to a novel acoustical interferometric apparatus and method whereby changes in a physical condition of a medium may be detected.

There are many instances where it is necessary to obtain physical measurements of a solid, liquid or gaseous medium but the environment or local conditions make it difficult and/or relatively expensive to do so using conventional systems or devices. Further it is often desired to incorporate a measuring or sensing system as a component in a larger control system, and in this case such a sensing component must be readily compatible with the other cooperating portions of the larger control system in terms of costs, speed of operation, sensitivity and reliability. The instant invention contemplates providing an efficient system and apparatus for meeting these needs.

The primary object of the invention is to provide a novel combination including an ultrasonic generating device and an acoustical sensing device so as to provide a very low cost reliable system for measuring temperature, density and other properties of a medium.

Another object of the invention is to provide a very efficient interferometric technique for sensing changes in the density, temperature and other conditions in a solid, liquid and/or gaseous medium.

A further object of the instant invention is to provide a novel acoustical interferometric method and apparatus whereby changes in a physical condition of a medium may be sensed by detecting shifts in a normal pattern of acoustical interference fringe lines, such shifts resulting from these variations in the speed of travel of the acoustical waves through the medium caused by changes in that physical condition.

Other objects of the invention will become apparent as the disclosure progresses.

Reference to and incorporation herein is made with respect to the disclosed subject matter of my copending patent application Ser. No. 722,886, filed Apr. 22, 1968, entitled "Interferometer," (now U.S. Pat. No. 3,500,951) wherein an acoustical interferometric system and apparatus is disclosed which is capable of measuring the position or location of a surface. The acoustical wave generating means and the acoustically sensitive means described therein are used as components in the instant system and if any structural and/or functional details of such components are desired reference may be made to said patent.

Figure 1:
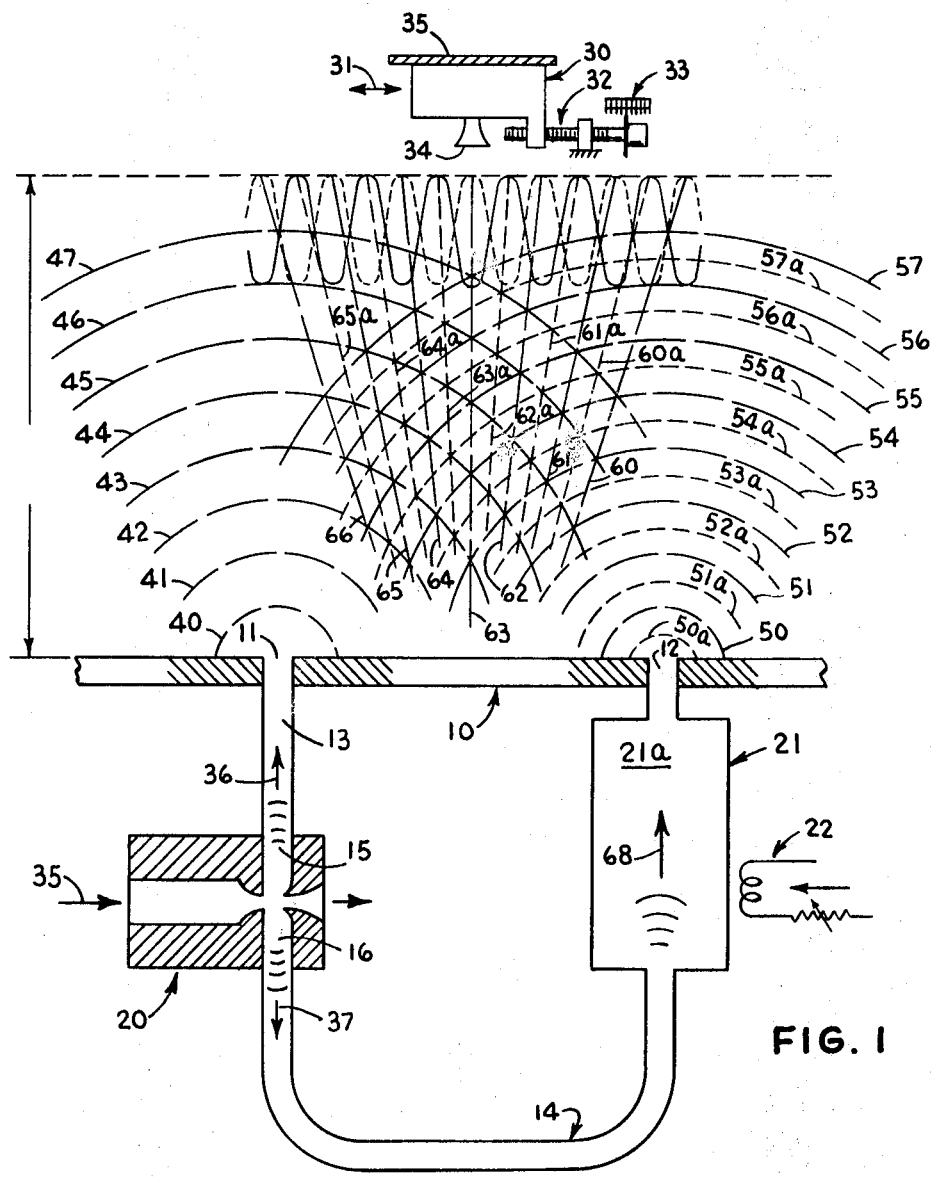
FIG. 1 is a diagrammatic view illustrating a method and apparatus for detecting and measuring changes in the temperature of a gaseous medium.

Referring now to FIG. 1 of the instant drawings the reference numeral 10 indicates a flat wall that is provided with two spaced ports 11 and 12, these ports being respectively connected by suitable acoustical radiation conduits 13 and 14 to the two output chambers 15 and 16 of an acoustical wave generating means or whistle 20; the latter being similar to that described in connection with FIGS. 4–6 of said patent. The conduit 14 has a portion or container 21 therein serving to enclose a volume or region 21a of gas (e.g. air) that is adapted to be heated by any source 22 of heat. It is not critical that the cross-sectional area of the portion 21 be greater than that for conduit 14.

Disposed in spaced relation with the wall 10 and variably positionable in substantially the same plane as the parallel axes of the said ports 11 and 12 is an acoustical sensing device 30 that is adapted to be adjustably moved substantially parallel to said plane and wall, as indicated by arrow 31, by means of any suitable threaded means 32 that has a suitable calibrated scale 33 associated therewith. The sensing device 30 which is illustrated with its signal receiving opening 34 facing the said wall 10 is slidably supported by any suitable means on a frame support 35. The sensing means 30 is operationally sensitive to the radiation from either port 11 or 12, and includes a turbulence type fluid amplifier as described in said patent.

The operation of the system will now be described. It will first be assumed that the heat source is not operative so that the temperature in all parts and regions of the system is uniform at some datum level T. Under these circumstances air or other fluid is constantly supplied to the whistle 20 as indicated by arrow 35 so that relatively high frequency acoustical radiation, at say 50,000 Hertz, is generated and transmitted through the conduits 13 and 14 as indicated by arrow 36 and 37 respectively. The resultant ultrasonic radiation emanating from port 11 is illustrated by the arcs 40–47 while the simultaneous corresponding radiation from port 12 is illustrated by arcs 50–57. Under these conditions the two sets 40–47 and 50–57 of simultaneous coherent acoustical waves interfere with one another and thereby establish a predetermined pattern of acoustical interference fringes illustrated by lines 60–67. These fringe lines will be fixed in location (relative to ports 11 and 12) in the region between the wall 10 and sensing device 30 during said normal operating conditions at temperature level T. Under these operative conditions the adjusting means 32 is actuated so as to bring the sensing means 30 into a position such that signal receiving opening 34 thereof is operatively aligned with one of said fringe lines; line 63 in the case illustrated in FIG. 1. When so positioned the absence of any effective acoustical signal reaching the sensing device 30 causes the latter to maintain a normal fluid output pressure.

If the heat source 22 is not operative so as to raise the temperature of the gas medium inside the container or enlarged portion 21 of the conduit 14 the speed of transmission of the acoustical waves through this medium will increase with the result that there will be a phase shift of the radiation emanating from port 12 as indicated in FIG. 1 by the second set of arcs 50a–57a. When such a shift occurs there will be an accompanying shift in the position of said interference fringe lines as illustrated by lines 60a–65a of FIG. 1. Such a shift in the particular fringe line 63a will now cause an effective acoustical signal to reach and enter the said opening 34 of the sensing means 30 which in turn of course will produce a change in the fluid output pressure of the sensing means. This change in output will be indicative of the temperature change in region 21a and may be used in any suitable manner, for example as a feedback signal to control the heat source 22, or as a control for a servo or other type of mechanism. To determine the extent of said temperature rise in said medium 21a the adjustable means 32 may be operated to bring said opening 34 back into alignment with the said shifted fringe line 63a and the appropriate displacement reading then taken from the calibrated scale 33.

Figure 2:
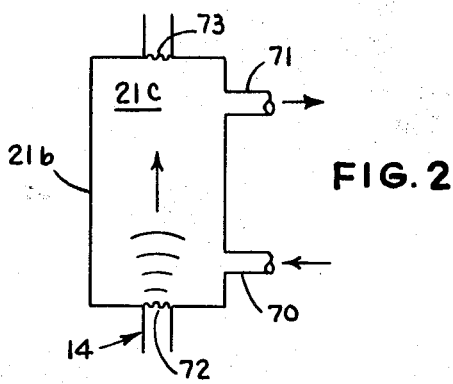
FIG. 2 is a diagrammatic view illustrating a modification of the FIG. 1 method and apparatus whereby the changes in the density of a gaseous medium may be detected and measured.

The instant system is based on the principle that the transmission speed of acoustical radiation through a medium is a function of the medium density, the latter of course being related to temperature. There are many instances where changes of densities, unaccompanied by any significant temperature changes, are desired to be sensed, and these changes may also be readily detected as will now be described. Referring to FIG. 2 a modification of the FIG. 1 system is shown. Instead of a heat source the container 21b is provided with inlet and outlet conduits 70, 71 so that the different types of gases may be circulated through the substantially enclosed region 21c. Mylar diaphragms 72 and 73 are mounted at either end of container 21b so that the fluid in conduit 14 will not mix with the fluid in region 21c: these diaphragms nonetheless allowing the acoustical radiation from whistle 20 to move through conduit 14, region 21c to port 12. Different gases (or varying concentrations and/or mixtures thereof) having different densities in passing through the region 21c will thus alter the speed of transmission of the said acoustical radiation through this region and hence this action will produce a shift in the position of the interference fringe lines in a manner similar to that described above in connection with FIG. 1. In this fashion the instant system may be readily adapted to detect and measure changes in the density of the medium in region 21c, and of course may also be used to determine the presence or absence of different gases (or other materials through which the acoustical radiation in conduit 14 is constrained to pass) or different concentrations and/or mixtures thereof. Here again the adjusting means 33 may be manipulated as before to determine the extent of such density changes.

The instant system may be used in flow or velocity metering and can be efficiently utilized in very hostile environments and/or in otherwise almost inaccessible locations. Furthermore, the system lends itself to interconnection with additional circuitry of servo, feedback or other types of control systems. The instant apparatus has few moving parts, is very simple, reliable, rugged and relatively inexpensive.

I claim:
1. An acoustical interferometric sensing system comprising:
whistle means adapted to generate high frequency acoustical waves;
means for directing said acoustical waves along two separate paths and thereafter causing said waves to mutually interfere with one another so as to establish a pattern of acoustical interference fringe lines;
conduit means disposed along one of said paths and arranged to permit at least some of said waves to pass through a sample medium whose density is to be sensed;
a turbulence-type amplifier having a control port; and
mounting means for said turbulence-type amplifier and adapted to position said amplifier so that said control port may be effectively disposed along one of said acoustical fringe lines whereby said turbulence amplifier is adapted to be controlled in accordance with the location of said fringe line.

2. Apparatus as defined by claim 1: additionally comprising heating means for heating said sample medium.

3. Apparatus as defined by claim 1 wherein said conduit means includes a chamber through which said sample medium may flow.

4. Apparatus as defined by claim 1 wherein said conduit means includes flexible wave transmitting diaphragms.